(12) United States Patent
Berry et al.

(10) Patent No.: US 6,481,969 B2
(45) Date of Patent: *Nov. 19, 2002

(54) APPARATUS AND METHODS FOR BALANCING TURBINE ROTORS

(75) Inventors: Robert Randolph Berry, Greenville, SC (US); Gene David Palmer, Clifton Park, NY (US)

(73) Assignee: General Electric Company, Schenectady, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,046

(22) Filed: May 10, 1999

(65) Prior Publication Data

US 2002/0028141 A1 Mar. 7, 2002

(51) Int. Cl.$^7$ ................................................. F01D 5/00

(52) U.S. Cl. ....................... 416/145; 416/500; 74/573 R

(58) Field of Search ......................... 415/119; 416/114, 416/145, 500; 74/573 R

(56) References Cited

U.S. PATENT DOCUMENTS

| | | | |
|---|---|---|---|
| 3,584,971 A | | 6/1971 | Ortolano et al. |
| 3,736,811 A | * | 6/1973 | Neary ....................... 74/573 R |
| 4,645,425 A | | 2/1987 | Morrison, Jr. |
| 4,817,455 A | * | 4/1989 | Buxe .......................... 74/573 R |
| 4,842,485 A | * | 6/1989 | Barber ......................... 146/144 |

FOREIGN PATENT DOCUMENTS

| | | |
|---|---|---|
| DE | 412730 | 5/1925 |
| JP | 55-72937 | * 4/1980 |
| JP | 56-153956 | * 4/1980 |

OTHER PUBLICATIONS

"39$^{th}$ GE Turbine State–of–the–Art Technology Seminar", Tab 1, "F" Technology –the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hx 170–MW Class Gas Turbine", A. S. Arrao, Aug. 1996.

"39th GE Turbine State–of–the–Art Technology Seminar", Tab 4, "MWS6001FA –An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M.W. Horner, Aug. 1996.

(List continued on next page.)

*Primary Examiner*—Edward K. Look
*Assistant Examiner*—Ninh Nguyen
(74) *Attorney, Agent, or Firm*—Nixon & Vanderhye

(57) ABSTRACT

Dovetail-shaped grooves are formed in the axial faces and circumferential rims of wheels and spacers forming a rotor body. Complementary-shaped balance weights are inserted through entry apertures in the grooves and circumferentially aligned into adjusted balanced positions. Fasteners are threaded through the weights to engage in slots at circumferentially spaced positions along ribs projecting from the bases of the grooves. By threading the fastener into the slot and staking the fastener to the balance weight, the metal of the rotary component is not upset or deformed, with the result that the potential for development of cracks in the rotary component is substantially reduced.

19 Claims, 5 Drawing Sheets

OTHER PUBLICATIONS

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 –Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greensville, SC", Document #1753, Feb. 1998, Publication Date: Nov. 17, 1998, Report Numbers DE–FC21–95MC31176—11.

"Exhibit panels used at 1995 product intoduction at Power-Gen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology, GE Introduces Advanced Gas Turbine Technology Platform: First to Reach 60% Combined–Cycle Power Plant Efficiency", Press Information, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State—Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"Testing Process", Jon Ebacher, VP, Power Gen Technology, May 8, 1998.

"Heavy–Duty & Aeroderivative Products", Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. I, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. I, "Rayleigh/Raman/LIF Measurements in a Turbulent Lean Premixed Combustor", Nandula et al. pp. 233–248, Oct., 1995.

"Proceedings of the Advanced Turbine Systems Annual Program Review Meeting", vol. I, "Lean Premixed Flames for Low $No_x$ Combustors", Sojke et al., pp. 249–275, Oct., 1995.

"Proceedings of the Advanced Turbine Systems Annual Program Review Meeting", vol. I, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. I, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. I, "Life Prediction of Advanced Materials for Gas Turbine Application", Zamrik et al., Oct., 1995.

"Proceedings of the Advanced Turbine Systems Annual Program Review Meeting", vol. I, "Advanced Combustion Technologies for Gas Turbine Power Plants", Vandsburger et al., pp. 328–352, Oct., 1995.

"Proceedings of the Advanced Turbine Systems Annual Program Review Meeting", vol. I, "Combustion Modeling in Advanced Gas Turbine Systems", Smoot et al., pp. 353–370, Oct., 1995.

"Proceedings of the Advanced Turbine Systems Annual Program Review Meeting", vol. I, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. I, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experimentss: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Lox $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", vol. II, "ATS and the Industries of the Future", Denise Swink, p. 1, Nov., 1996.

"Proceedings of the Advanced Turbine Systems Annual Program Review Meeting", vol. II, "Gas Turbine Association Agenda", William H. Day, pp. 3–16, Nov., 1996.

"Proceedings of the Advanced Turbine Systems Annual Program Review Meeting", vol. II, "Power Needs in the Chemical Industry", Keith Davidson, pp. 17–29, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 1996.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application,", Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "", Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Minking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp.513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramic for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine –High Efficiency, Low Cost of Electricity and Low Emissions", Roger Schonewald and Patrick Marolda, (no date available).

"The Next Step In H . . . For Low Cost Per kW–Hour Power Generation", LP–1 PGE '98.

"Utility Advanced Turbine (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628,.

"Utility Advanced Turbine (ATS) Technolofy Readiness Testing —Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Testing Readiness Testing and Pre–Commercial Demonstration, Phase 3", Document #486029, Oct. 1–Dec. 31, 1995, Publication Date, May 1, 1997, Report Numbers: DOE/MC/31176—5340.

"Utility Advanced Turbine System (ATS) Technology Readiness Testing Pre–Commercial Demonstration –Phase 3", Document #486132, Apr. 1 –Jun. 30, 1976, Publication Date, Dec. 31, 1996, Report Numbers: DOC/MC/31176–5660.

"Utility Advanced Turbine System (ATS) Technology Readiness Testing Pre–Commercial Demonstration –Phase 3", Document #587906, Jul. 1 –Sep. 30, 1995, Publication Date, Dec. 31, 1995, Report Numbers: DOE/MC/31176—5339.

"Utility Advanced Turbine System (ATS) Technology Readiness Testing Pre–Commercial Demonstration –Phase 3", Document #666277, Apr. 1 –Jun. 30, 1997, Publication Date, Dec. 31, 1997, Report Numbers: DOE/MC/31176—8.

"Utility Advanced Turbine System (ATS) Technology Readiness Testing Pre–Commercialization Demonstration" Jan. 1 –Mar. 31, 1996, DOE/MC/31176—5338.

"Utility Advanced Turbine System (ATS) Technology Readiness Testing Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine System (ATS) Technology Readiness Testing and Pre–Commercial Demonstration", Annual Technical Progress Report, Reporting Period: Jun. 1, 1995 –Sep. 30, 1996.

"Utility Advanced Turbine Systems (ATS) Technology Readiness Testing", Phase 3R, Annual Technical Progress Report, Reporting Period: Oct. 1, 1997—Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

Fig. 2 (Prior Art)
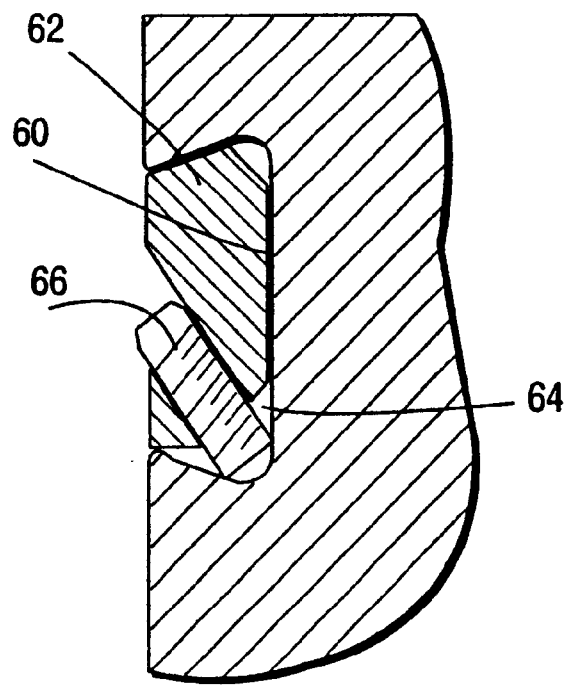
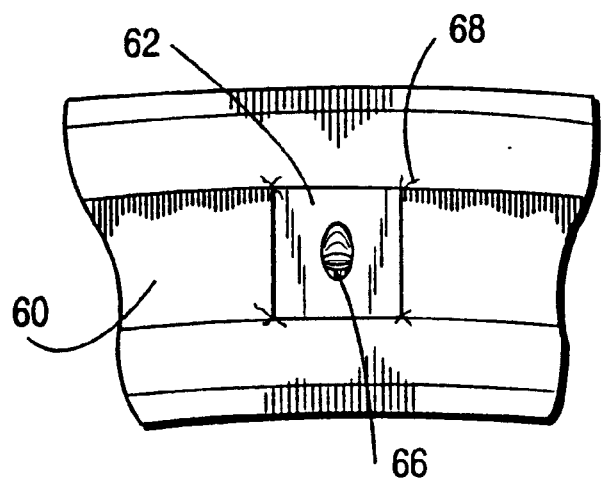
Fig. 3 (Prior Art)

APPARATUS AND METHODS FOR BALANCING TURBINE ROTORS

TECHNICAL FIELD

The present invention relates to apparatus and methods for balancing turbine rotors and particularly relates to balancing turbine rotors without deforming or otherwise penetrating the rotor component to which a balance weight is secured.

BACKGROUND OF THE INVENTION

A traditional method for balancing a rotor for a turbine, for example, a gas turbine, is to provide a 360° circumferential balance groove in one or more of the rotational components at locations corresponding to as large a radius as possible. These balance grooves are typically configured to lie in vertical planes normal to the rotor axis on the axial faces and circumferential rims of rotary components of the rotor, e.g., wheels and spacers. Conventionally, balance weights are then installed in the axial facing balance grooves of such components to counterbalance any imbalance that may exist in such individual components prior to assembly of the rotor. After assembly, spool balance weights are provided in the circumferential grooves to balance the rotor spool. After assembly of the buckets on the wheel rims, the rotor is finally balanced using weights applied to the circumferential grooves.

Typically, each of the circumferential and axially facing grooves has a generally dovetail configuration for receiving a complementary-shaped balance weight. In the axial facing vertical groove, each balance weight features an angled screw with a portion of the dovetail along the underside of the complementary-shaped balance weight removed so that the screw can be tightened into the corner of the groove to effectively hold the balance weight in the groove and without motion relative to the rotary component. In a circumferential, i.e., horizontal groove, a threaded opening is provided centrally through the balance weight and a screw fastener threads through the opening and bears against the base of the groove to secure the dovetail-shaped balance weight in the complementary-shaped groove. In each case, the rotary component and balance weight are staked to one another to prevent relative motion therebetween.

While these balance weight and slot combinations have proved effective, a potential remains for creating or inducing cracks in the rotary component upon its deformation by staking the component and balance weight to one another. Consequently, there has developed a need for a balance weight/groove combination for balancing rotary components and rotor assemblies in turbines which holds the balance weight against motion relative to the rotary component without staking the component and balance weight to one another and without otherwise deforming the material of the rotary component.

BRIEF SUMMARY OF THE INVENTION

In accordance with the present invention, apparatus and methods are provided for balancing rotary components and rotor assemblies of a turbine without deforming, particularly without staking, the rotary component yet preventing movement of the balance weight and component relative to one another. To accomplish the foregoing, the rotary component is provided with a generally dovetail-shaped groove, e.g., in an axial face of the component normal to the axis of rotation of the component and in a rim extending circumferentially about the axis of rotation. Each groove has a projecting rail or rib along the base of the groove. A plurality of slots or recesses are formed in the rib at spaced circumferential locations one from the other about the groove. The groove also has one or more loading apertures where the side walls of the groove are spaced further from one another than remaining portions of the groove to enable insertion of one or more balance weights into the groove. The balance weights are preferably complementary in shape to the shape of the groove, i.e., dovetail-shaped. Each weight has a recess along its underside extending from end-to-end whereby, upon insertion of the balance weight into the dovetail groove, the weight can slide circumferentially along the groove to a selected location in registration with a slot.

At the selected location, a threaded fastener is extended through the balance weight into the slot for engagement against a base of the slot to preclude circumferential movement of the balance weight relative to the rotary component. To ensure against unthreading movement of the fastener, the balance weight and fastener are secured to one another, in addition to their threaded securement, for example, by staking. In this manner, the prior requirement for staking the rotary component and balance weight to one another is entirely eliminated, in turn eliminating the potential for crack formation in the rotary component as a result of staking the balance weight and rotary component to one another. Also, the weight can be adjusted by removing material adjacent an end thereof whereby substantially an infinite adjustment in locating the weight can be accomplished.

In a preferred embodiment according to the present invention, there is provided apparatus for balancing a turbine rotor about an axis of rotation, comprising a turbine component having a generally annular dovetail-shaped groove in a plane normal to the axis of rotation, a rib projecting outwardly of a base of the groove and having slots at spaced locations therealong interrupting the rib, a balance weight receivable in the groove and having a recess along an underside thereof for receiving the projecting rib of the groove, the balance weight having an opening therethrough between inner and outer sides thereof and a fastener in the opening having an end thereof engaging the groove in the slot, the fastener and the balance weight being staked to one another to secure the fastener and the balance weight to one another.

In a further preferred embodiment of the present invention, there is provided apparatus for balancing a turbine rotor about an axis of rotation comprising a plurality of wheels and spacers alternately stacked against one another and forming the rotor, at least one each of the wheels and spacers having a generally dovetail-shaped groove thereabout in a plane normal to the axis of rotation thereof, a rib projecting outwardly of a base of each groove, each rib being interrupted at circumferentially-spaced locations thereabout forming slots in the rib, a balance weight receivable in each groove, and having a recess along an underside thereof for receiving the projecting rib of the groove, each balance weight having an at least partially threaded opening therethrough between an outer side thereof and the underside and a threaded fastener threadedly engaging in each partially threaded opening and having an end thereof engaging said groove in the slot and means for securing the fastener and the balance weight to one another other than by the threaded engagement therebetween.

In a still further preferred embodiment according to the present invention, there is provided a method of balancing a turbine rotor about an axis of rotation wherein the rotor has a groove thereabout in a plane normal to the axis of rotation and a balance weight slidable along the groove into a predetermined location, comprising the steps of forming an outwardly projecting rib along a base of and substantially coextensively with the groove, forming a balance weight loading aperture in the groove, inserting a balance weight into the loading aperture, the balance weight having a recess extending from end-to-end thereof for receiving the rib of the rotor groove, providing slots in the rib at selected locations therealong, sliding the balance weight from the loading aperture along the groove into a selected location along the groove, threading a fastener through a complementary threaded opening in the balance weight into the slot and engaging a base of the slot to preclude circumferential displacement of the balance weight along the groove and securing the fastener and the balance weight to one another other than by the threaded engagement therebetween.

BRIEF DESCRIPTION OF THE DRAWINGS

FIG. 2 is a fragmentary cross-sectional view illustrating a vertical groove and corresponding balance weight according to the prior art;

FIG. 3 is a fragmentary side elevational view of the balance groove and weight of FIG. 2;

DETAILED DESCRIPTION OF THE INVENTION

Figure 1:
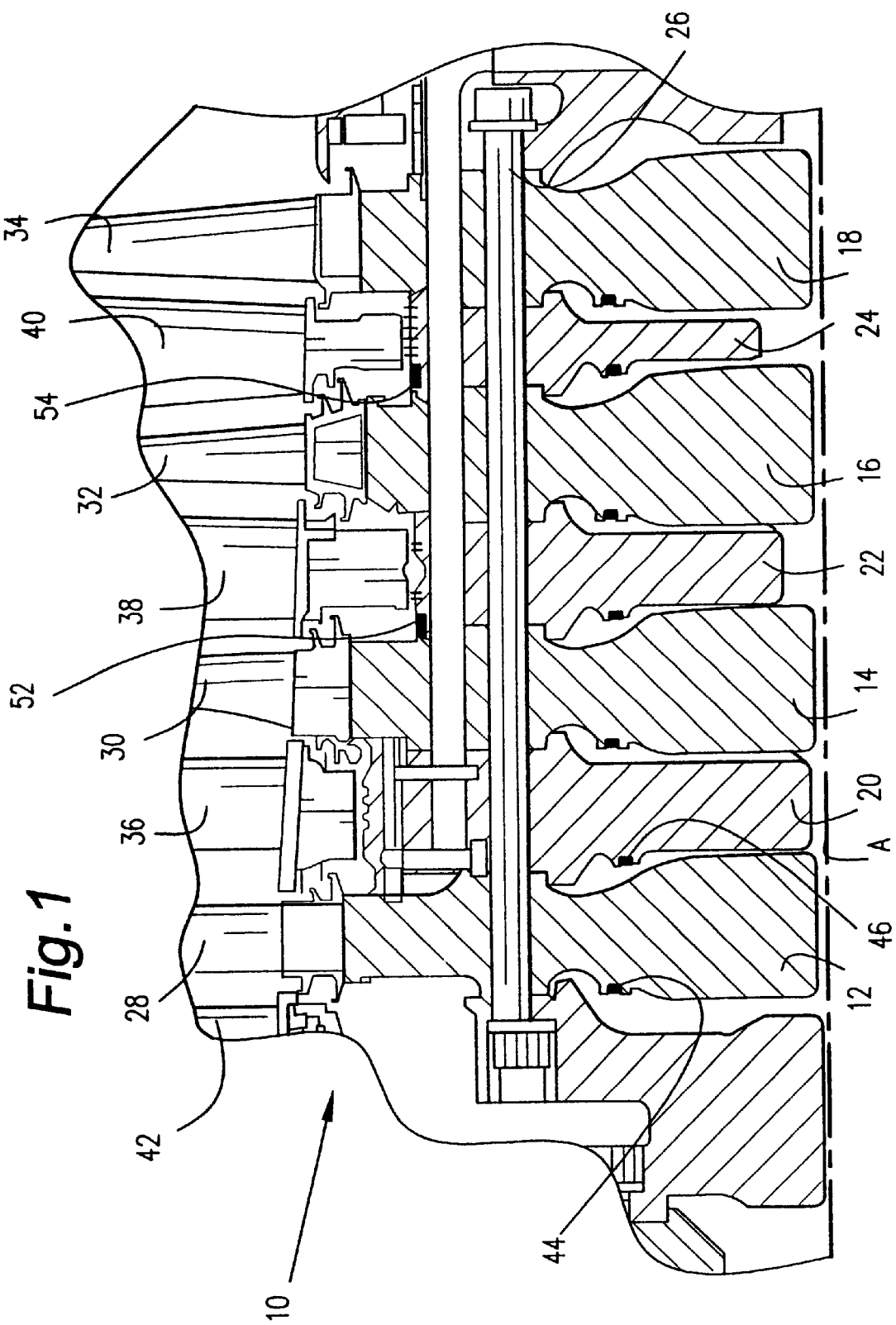
FIG. 1 is a fragmentary cross-sectional view of a turbine section illustrating application of balance weights to the turbine rotor components in accordance with a preferred embodiment of the present invention.

Referring to FIG. 1, there is illustrated a turbine section comprised of a rotor, generally designated 10, for rotation about an axis A. Rotor 10 includes a plurality of wheels 12, 14, 16 and 18 alternating along axis A with a plurality of spacers 20, 22 and 24. The wheels and spacers are secured one to the other by a plurality of circumferentially spaced elongated bolts, one of which is illustrated at 26 forming a stacked rotor comprising the wheels and spacers. It will be appreciated that the wheels 12, 14, 16 and 18 mount a circumferential array of buckets 28, 30, 32 and 34, respectively, while the rims of the spacers 20, 22 and 24 lie in radial opposition to nozzles 36, 38 and 40, respectively. It will also be appreciated that a nozzle 42 forms part of the first stage of the turbine with the buckets 28. As conventional, the wheels and spacers rotate about axis A, while the nozzles 36, 38, 40 and 42 are stationary in the hot gas path of the turbine.

To balance the rotor components, i.e., the wheels and spacers, a plurality of grooves are formed on at least one of the axial faces of each of the wheels and spacers. For example, grooves 44 and 46 are formed on the forward faces of wheel 12 and spacer 20, respectively. Similar grooves are formed as illustrated on the forward axial faces of wheels 14, 16 and 18 and spacers 22 and 24. One or more balancing weights are disposed in each of the grooves for balancing these rotor components prior to their assemblage to form rotor 10.

It will also be appreciated that the rim of one or more of the spacers 20, 22 and 24 has a radially outwardly opening groove, for example, the grooves 52 and 54 of spacers 22 and 24. One or more balancing weights are similarly formed in these radially opening grooves to balance the rotor.

As indicated previously, the components of the rotor, i.e., the wheels and spacers, are initially balanced using the axially facing grooves and weights therein. After assembly of the rotor wheels and spacers, a rotor spool balancing is accomplished by inserting one or more weights into the circumferential grooves. Finally, after the buckets are applied to the rotor, a final turbine rotor balance is achieved, likewise by inserting one or more weights into the circumferential grooves.

Referring to FIG. 2, the axial faces of the prior art rotary components typically had annular, generally dovetail-shaped grooves for receiving complementary-shaped weights 62. Portions of each weight were cut away in the corner 64 such that a threaded fastener 66 threads through the weight 62 at an inclined angle and bears against the inside surface of the groove 60 to retain the weight in an adjusted position about the groove. In accordance with the prior art as illustrated in FIG. 3, once the position of the weight in the groove was established and the fastener was threaded into engagement in the groove, the weight 62 was secured to the component, for example, the wheel or spacer, by staking at each of the four corners of the balance weight, as illustrated at 68. Staking constitutes a deformation of the metal of each of the parts staked to one another and, as indicated previously, this has the potential to form cracks in the rotary component.

Figure 4:
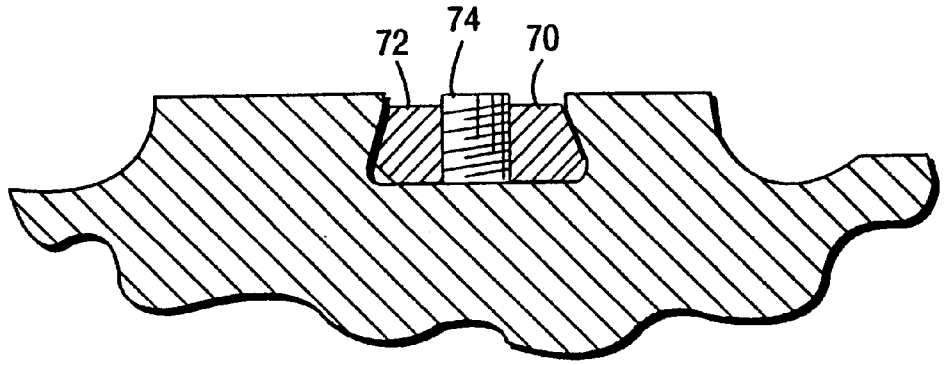
FIG. 4 is a fragmentary cross-sectional view of a balance groove and weight in a circumferential rim of a rotor part according to the prior art.
Figure 5:
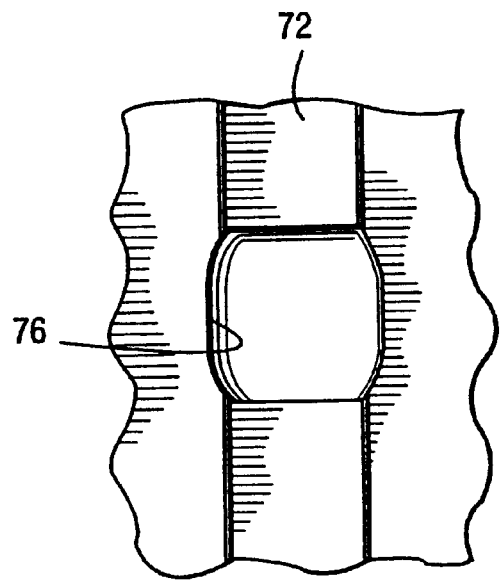
FIG. 5 is a plan view thereof.

Referring to FIGS. 4 and 5, a similar groove and balance weight arrangement was provided in the circumferential grooves. Thus, a balance weight 70 having a dovetail shape was inserted into a complementary-shaped groove 72 and a centrally disposed threaded fastener 74 secured the balance weight 70 in the groove. The balance weight 70 was inserted into an entry aperture 76 at a predetermined location about the groove such that the weight could slide along the groove to an adjusted location. Again, as in the case of balance weights in axially facing grooves, these balance weights of the prior art were typically staked to the rotary component.

Figure 6:
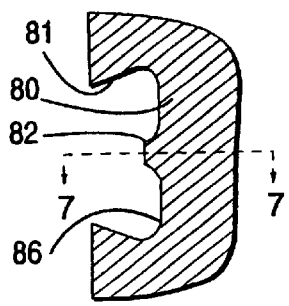
FIG. 6 is a fragmentary cross-sectional view of a vertical groove for a balance weight in accordance with a preferred embodiment of the present invention.

Referring to FIG. 6, there is illustrated a generally dovetail-shaped groove 80 formed in accordance with a preferred embodiment of the present invention and which is illustrated in an axial face of a component of the rotor, i.e., a wheel or spacer. It will be appreciated that the following description of the groove and balance weight in an axial face of a component is also applicable to a groove and weight disposed along the circumference or rim of a spacer. As illustrated in FIG. 6, the dovetail-shaped groove 80 has inclined side walls 81 and a base 86 having a central outwardly projecting rib or rail 82 which preferably lies coextensively with the length of the groove 80.

Figure 7:
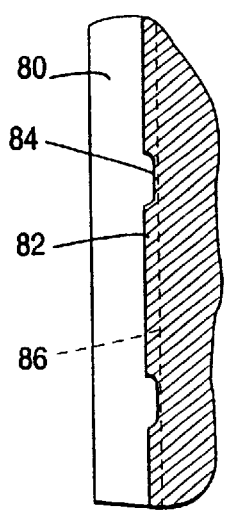
FIG. 7 is a cross-sectional view thereof taken generally about on line 7—7 in FIG. 6.

As illustrated in FIG. 7, the rib 82 is interrupted by circumferentially spaced lots 84, the base of the groove being indicated by the dashed lines 86 in FIG. 7 and the bases of the slots indicated at 87.

Figure 8:
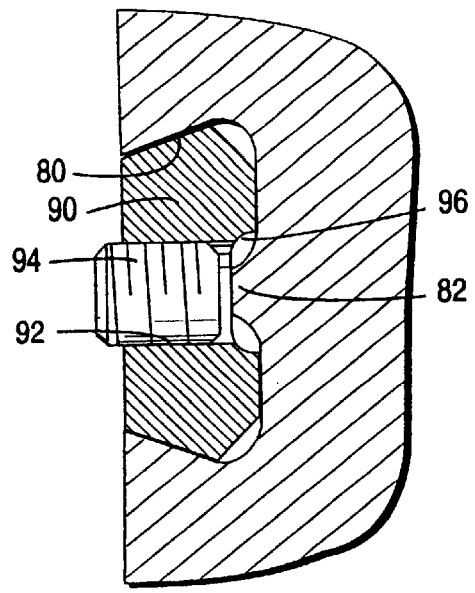
FIG. 8 is an enlarged fragmentary cross-sectional view of the groove of FIG. 6 illustrating the balance weight hereof in the slot and prior to securement.
Figure 9:
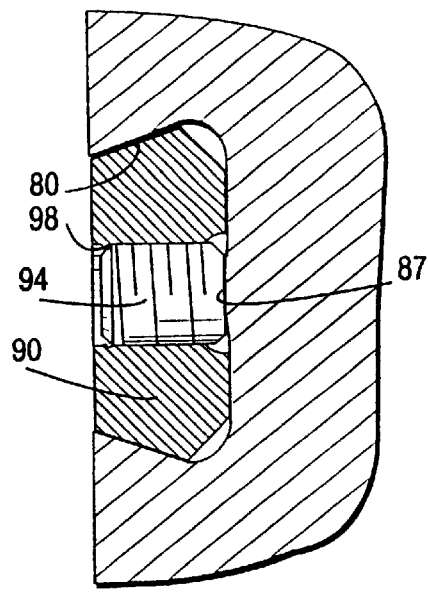
FIG. 9 is a view similar to FIG. 8 with the balance weight located circumferentially along the groove and secured.

Referring to FIGS. 8 and 9, a generally complementary-shaped balance weight 90 is provided for reception in the groove 80. As illustrated, the cross-sectional configuration of the balance weight 90 is complementary to the cross-sectional configuration of the groove 80. The balance weight 90 is receivable in the groove 80 through an entry aperture, similarly as illustrated in FIG. 5. Balance weight 90 has a central opening 92 which is at least partially and preferably fully threaded to receive a male threaded fastener 94. The underside of the balance weight 90 has a recess 96 extending from end to end for receiving the projecting rib 82. Consequently, when the balance weight 90 is received in the entry slot, the recess 96 registers in opposition with the rib 82. Additionally, the weight 90 is slidable along the groove to any desired adjusted location therealong such that the fastener 94 may register with a selected one of the slots 84 formed in the rib 82. Consequently, with the fastener 94 backed off as illustrated in FIG. 8 from a fully fastened position, the weight, 90 with the rib 82 in recess 96 is slidable along the groove 80 into a position such that the threaded fastener 94 is threaded down to engage in a slot 84 as illustrated in FIG. 9. With the complementary dovetail shapes of the groove and balance weights, and the threading action of the fastener 94 having an inner end received in the slot 84, it will be appreciated that the balance weight cannot move along the groove 80 and is thus retained in its adjusted position along groove 80.

Figure 10:
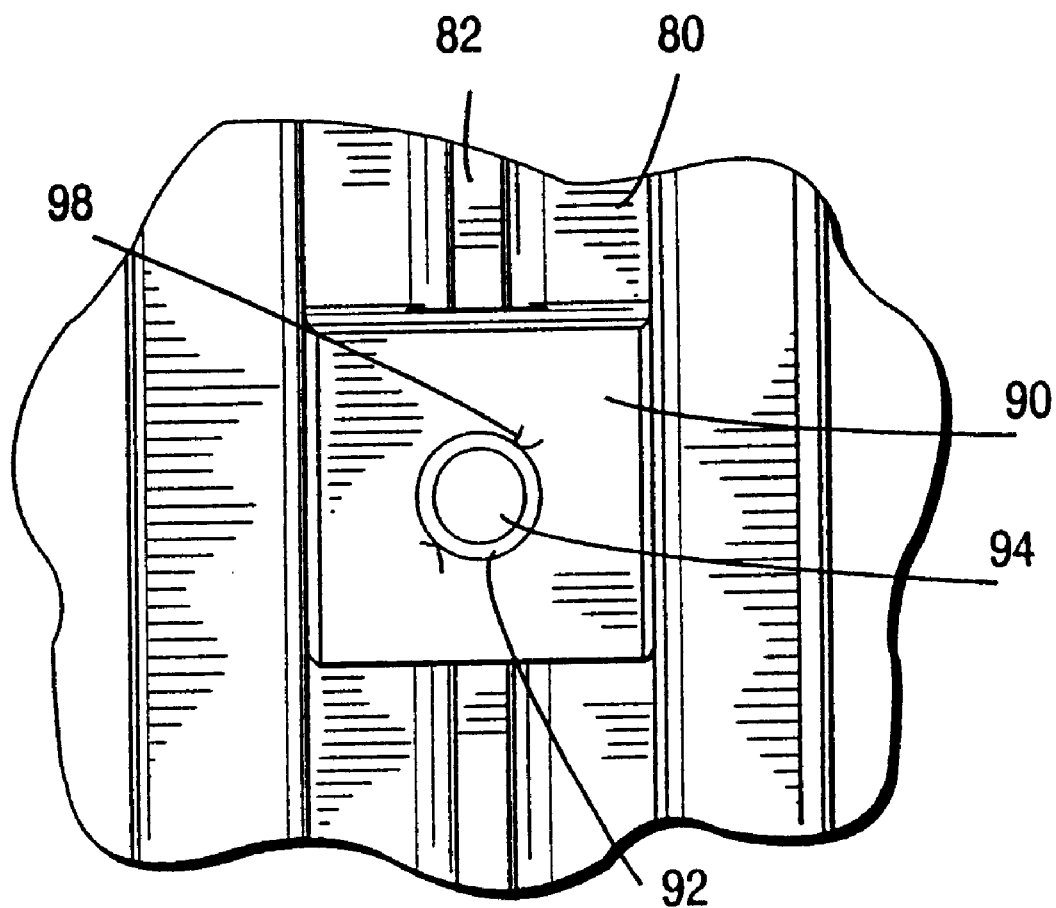
FIG. 10 is a fragmentary plan view thereof.

Means are provided, other than the threaded engagement between the fastener and the balance weight, to prevent the fastener 94 from backing out of the threaded opening in the balance weight. Preferably, such means includes staking the fastener to the balance weight. It will be appreciated, however, that other types of securing means such as welding or otherwise mechanically securing the fastener and weight to one another may be utilized. Staking, however, is preferred as it constitutes a simple and reliable method of securing the fastener to the weight. The deformed metal formed by the staking process is illustrated at 98 in FIGS. 9 and 10. The staking may be provided at one location but is preferably provided at two circumferentially spaced locations as illustrated. It will therefore be appreciated that deformation of the metal of the component is avoided entirely in securing the fastener and weight to one another, thereby avoiding the potential for cracks in the rotary component as a result of the staking operation.

By locating the foregoing described grooves in the axial faces of the rotor components, i.e., the wheels and spacers, each component may be initially balanced about an axis of rotation. A standard sized weight or weights of different sizes may be used, depending on the need for a particular weight at a particular location. With each rotor component initially balanced, the components are assembled to form the rotor spool 10. One or more weights are disposed in the circumferentially extending or rim grooves in order to balance the rotor spool thus formed. With the rotor spool balanced, the buckets and other ancillary parts are assembled on the rotor and a final rotor balancing is provided. This final balance uses the circumferential or rim grooves to apply weights about the rotor and, hence, balance the rotor about its axis of rotation. It will also be appreciated that while the balance weight fastener openings are registered with the slots of the rail, a substantially infinite adjustment of the weights can be accomplished by removing material from one end of the weights, thus affording a fine and substantially infinite adjustment to the balance of the rotor.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for balancing a turbine rotor about an axis of rotation, comprising:
    a turbine component having a generally annular dovetail-shaped groove in a plane normal to the axis of rotation;
    a rib projecting outwardly of a base of said groove and having slots at spaced locations therealong interrupting said rib;
    a balance weight receivable in said groove and having a recess along an underside thereof for receiving the projecting rib of said groove, said balance weight having an opening therethrough between inner and outer sides thereof; and
    a fastener in said opening having an end thereof engaging said groove in said slot, said fastener and said balance weight being staked to one another to secure said fastener and said balance weight to one another.

2. Apparatus according to claim 1 wherein said balance weight has a cross-sectional configuration generally complementary to a cross-sectional configuration of said groove.

3. Apparatus according to claim 1 wherein said opening through said balance weight is at least partially threaded and said fastener is threaded into said opening.

4. Apparatus according to claim 1 wherein said groove has at least one loading aperture having opposite side walls of said slot spaced from one another sufficiently to enable said balance weight for insertion into the groove, said walls of said groove at said loading aperture being spaced from one another a distance greater than the spacing between opposite side walls of said groove.

5. Apparatus according to claim 1 wherein said slot has a base engaged by said fastener, said base of said slot and the base of said groove lying at substantially a common elevation in said groove.

6. Apparatus according to claim 1 wherein said rib extends medially along the base of said groove between opposite side walls thereof and said recess along the underside of said balance weight lies medially of said side walls thereof and between opposite ends of said weight.

7. Apparatus according to claim 1 wherein said balance weight has a cross-sectional configuration generally complementary to a cross-sectional configuration of said groove, said slot having a base engaged by said fastener end, said base of said slot and the base of said groove lying at a substantially common elevation in said groove, said rib extending medially along the base of said groove between opposite side walls thereof and said recess along the underside of said balance weight lies medially of said side walls thereof and between opposite ends of said weight.

8. Apparatus according to claim 1 wherein said groove has at least one loading aperture having opposite side walls spaced from one another sufficiently to enable said balance weight for insertion into the groove, said walls of said groove at said loading aperture being spaced from one another a distance greater than the spacing between opposite side walls of said groove.

9. Apparatus according to claim 1 wherein said groove is formed in an axial face of said component body generally normal to and spaced radially from said axis of rotation.

10. Apparatus according to claim 1 wherein said groove is formed in a rim of said component body and faces generally radially outwardly of said body.

11. Apparatus for balancing a turbine rotor about an axis of rotation comprising:

a plurality of wheels and spacers alternately stacked against one another and forming the rotor, at least one each of said wheels and spacers having a generally dovetail-shaped groove thereabout in a plane normal to the axis of rotation thereof;

a rib projecting outwardly of a base of each said groove, each said rib being interrupted at circumferentially-spaced locations thereabout forming slots in said rib;

a balance weight receivable in each said groove, and having a recess along an underside thereof for receiving the projecting rib of said groove, each said balance weight having an at least partially threaded opening therethrough between an outer side thereof and said underside; and a threaded fastener threadedly engaging in each said partially threaded opening and having an end thereof engaging said groove in said slot; and means for securing said fastener and said balance weight to one another other than by said threaded engagement therebetween.

12. Apparatus according to claim 11 wherein each said balance weight is generally complementary in shape to said groove, said securing means including staking said fastener and said weight to one another.

13. Apparatus according to claim 11 wherein each said groove has at least one loading aperture having opposite side walls spaced from one another sufficiently to enable said balance weight for insertion into the groove, said walls of said groove at said loading aperture being spaced from one another a distance greater than the spacing between opposite side walls of said groove.

14. Apparatus according to claim 11 wherein each said rib extends medially along the base of each said groove between opposite side walls thereof and said recess along the underside of each said balance weight lies medially of said side walls, said securing means including staking said fastener and said weight to one another.

15. Apparatus according to claim 11 wherein said groove is formed along an axial face of each said wheel and spacer and along a rim of at least said one spacer.

16. A method of balancing a turbine rotor about an axis of rotation wherein the rotor has a groove thereabout in a plane normal to the axis of rotation and a balance weight slidable along said groove into a predetermined location, comprising the steps of:

forming an outwardly projecting rib along a base of and substantially coextensively with said groove;

forming a balance weight loading aperture in said groove;

inserting a balance weight into said loading aperture, said balance weight having a recess extending from end-to-end thereof for receiving the rib of said rotor groove;

providing slots in said rib at selected locations therealong;

sliding said balance weight from said loading aperture along said groove into a selected location along said groove;

threading a fastener through a complementary threaded opening in said balance weight into said slot and engaging a base of said slot to preclude circumferential displacement of said balance weight along said groove; and securing said fastener and said balance weight to one another other than by said threaded engagement therebetween.

17. A method according to claim 16 wherein the step of securing includes staking said fastener and said balance weight to one another.

18. A method according to claim 16 including forming said groove along an axial facing component of said rotor.

19. A method according to claim 16 including forming said groove along a radially outward face of said rotor.

* * * * *

UNITED STATES PATENT AND TRADEMARK OFFICE
CERTIFICATE OF CORRECTION

PATENT NO.    : 6,481,969 B2
DATED         : November 19, 2002
INVENTOR(S)   : Berry et al.

It is certified that error appears in the above-identified patent and that said Letters Patent is hereby corrected as shown below:

Column 4,
Line 35, kindly delete "each of the four comers" and insert -- each of the four corners -- therefor.
Line 65, kindly delete "circumferentially spaced lots" and insert -- circumferentially spaced slots -- therefor.

Column 5,
Line 19, kindly delete "the weight, 90 with the rib 82" and insert -- the weight 90 with the rib 82 -- therefor.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.         : 6,481,969 B2                                      Page 1 of 1
APPLICATION NO. : 09/309046
DATED              : November 19, 2002
INVENTOR(S)       : Berry et al.

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*